United States Patent [19]

Hutchison

[11] Patent Number: 4,949,071

[45] Date of Patent: Aug. 14, 1990

[54] VEHICLE COMMUNICATION DEVICE

[76] Inventor: Thomas A. Hutchison, R.D. #2, Box 368, New Wilmington, Pa. 16142

[21] Appl. No.: 381,477

[22] Filed: Jul. 18, 1989

[51] Int. Cl.$^5$ .................................. B60Q 1/50
[52] U.S. Cl. .................................. 340/468; 340/473; 362/80.1; 362/802
[58] Field of Search ............... 340/468, 470, 473, 479, 340/321, 332, 908.1, 908, 815.03, 815.15; 362/80.1, 80, 397, 802, 449, 450; 40/574; 248/205.2, 282

[56] References Cited

U.S. PATENT DOCUMENTS

| 2,705,750 | 4/1955 | Farnon | 362/802 X |
|---|---|---|---|
| 3,678,457 | 7/1972 | Lev | 340/468 |
| 3,781,790 | 12/1973 | Dawson | 362/80.1 X |
| 3,787,808 | 1/1974 | Knopf . | |
| 3,866,169 | 2/1975 | Haglund | 340/468 X |
| 3,949,218 | 4/1976 | Hayward | 362/233 |
| 4,112,376 | 9/1978 | Fosnough . | |
| 4,195,328 | 3/1980 | Harris, Jr. | 340/432 X |
| 4,264,979 | 4/1981 | Gutowski . | |
| 4,347,496 | 8/1982 | Kubalak et al. | 340/439 |
| 4,361,828 | 11/1982 | Hose . | |
| 4,449,167 | 5/1984 | Cohen | 362/80.1 X |
| 4,574,269 | 3/1986 | Miller | 340/468 X |
| 4,633,215 | 12/1986 | Anders et al. | 340/473 |
| 4,751,618 | 6/1988 | Iacovelli | 362/802 X |

Primary Examiner—Joseph A. Orsino
Assistant Examiner—Brian R. Tumm
Attorney, Agent, or Firm—Leon Gilden

[57] ABSTRACT

A vehicle communication device wherein a display unit is selectively mountable onto a rear shelf of an automobile adjacent a rear window, including a safety switch to automatically de-energize the display unit when improperly oriented relative to the rear window. Suspension hooks are further included for selectively securing the display unit from rear or side windows of the automobile.

6 Claims, 4 Drawing Sheets

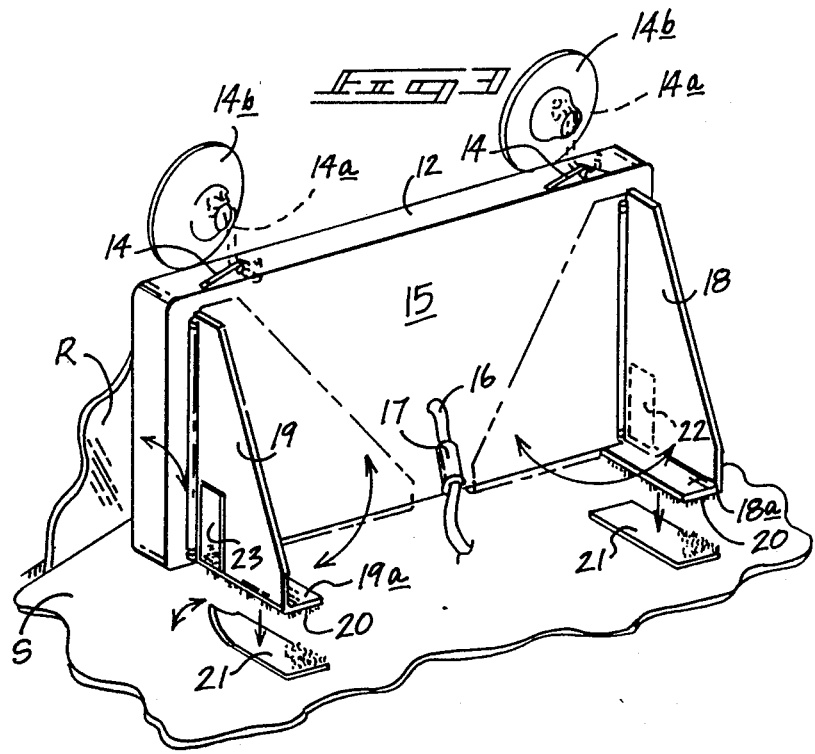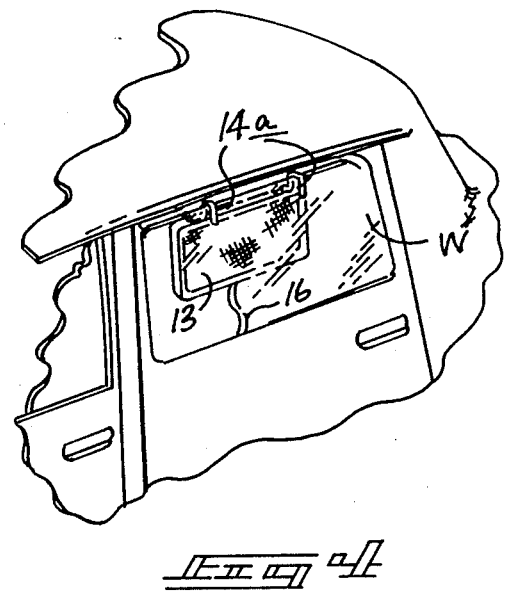

VEHICLE COMMUNICATION DEVICE

BACKGROUND OF THE INVENTION

1. Field of the Invention

The field of invention relates to visual communication devices, and more particularly pertains to a new and improved vehicle communication device wherein the same may be selectively mounted throughout the interior of a vehicle for visual display of communications directed from a control unit.

2. Description of the Prior Art

The use of visual display units has been set forth in the prior art wherein the prior art has heretofore failed to provide selectively arrangeable units that may be positioned throughout the interior of an automobile for display through side or rear windows, as set forth by the instant invention. For example, U.S. Pat. 4,112,876 to Fosnough, et al, sets forth a digital readout device wherein the same is fixedly mounted adjacent a rear window to display, in response to a rotary dial, a channel selection for a CB radio installation through the rear mounted display panel.

U.S. Pat. 3,787,808 to Knopf sets forth a signaling system mounted exteriorly of an automobile for indicating response of throttle and braking situations effected interiorly of the automobile.

U.S. Pat. 4,264,979 to Gutowski sets forth a CB display panel to exteriorly display a CB channel selected by the operator interiorly of an automobile.

U.S. Pat. 4,574,269 to Miller sets forth a visual communication device mounted fixedly adjacent a rear window for communicating messages utilizing light emitting diodes for display of the aforenoted messages.

U.S. Pat. 4,361,828 to Hose sets forth a visual display unit wherein the messages may be changed by insertion of vertically repositionable cards directed through top openings within a control unit utilizing various light emitting elements to effect such display.

As such, it may be appreciated that the prior art has heretofore failed to provide a selectively mounted visual display unit controlled by a selectively actuatable control unit to mount the display unit as desired interiorly of the automobile and further utilizing a safety switch to disengage actuation of the display unit upon improper orientation relative to a rear window reflective surface.

SUMMARY OF THE INVENTION

In view of the foregoing disadvantages inherent in the known types of visual communication devices now present in the prior art, the present invention provides a visual communication device wherein the same may be compactly mounted relative to various windows of an associated automobile. As such, the general purpose of the present invention, which will be described subsequently in greater detail, is to provide a new and improved visual communication device which has all the advantages of the prior art visual communication utilized in combination with vehicular devices and none of the disadvantages.

To attain this, the present invention comprises a display unit including light emitting diodes (LED) wherein the display unit utilizes hingedly mounted wing brackets mounted to a rear face of the display unit to selectively vertically or horizontally mount the unit fixedly in relation to a rear shelf of a vehicle and further incorporating a mercury switch to deactivate the display unit upon improper orientation of the display unit relative to the rear shelf and rear window of the automobile. Suspension clips may be further secured to upwardly extending ears of the display unit to mount the display unit relative to side windows of the vehicle. Additionally, the suspension clips may be utilized in conjunction with suction fasteners to mount the display unit relative to rear or side windows of the vehicle. A control unit utilized in combination with the display unit utilizes rear entry slide cartridges to properly align the cartridges relative to the control unit for manipulation of messages to be directed by the control unit to the display unit.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application which is measured by the claims, nor is it intended to be limiting as to the scope of the invention in any way.

It is therefore an object of the present invention to provide a new and improved visual communication device which has all the advantages of the prior art visual communication devices and none of the disadvantages.

It is another object of the present invention to provide a new and improved visual communication device which may be easily and efficiently manufactured and marketed.

It is a further object of the present invention to provide a new and improved visual communication device which is of a durable and reliable construction.

An even further object of the present invention is to provide a new and improved visual communication device which is susceptible of a low cost of manufacture with regard to both materials and labor, and which accordingly is then susceptible of low prices of sale to the consuming public, thereby making such visual communication devices economically available to the buying public.

Still yet another object of the present invention is to provide a new and improved visual communication device which provides in the apparatuses and methods of the prior art some of the advantages thereof, while simultaneously overcoming some of the disadvantages normally associated therewith.

Still another object of the present invention is to provide a new and improved visual communication device wherein the same includes a display unit to be selectively mounted to exterior and side windows of an associated automobile.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the followings detailed description thereof. Such description makes reference to the annexed drawings wherein:

FIG. 3 is an isometric illustration of the display unit and its selective mounting relative to a rear shelf of an automobile adjacent a rear window.

FIG. 4 is an isometric illustration of the display unit mounted to a side window of the automobile.

DESCRIPTION OF THE PREFERRED EMBODIMENT

Figure 1:
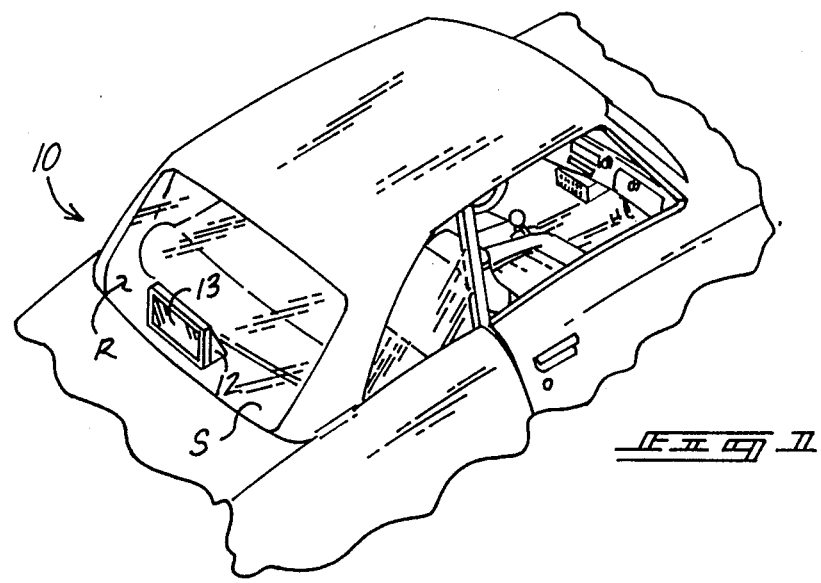
FIG. 1 is an isometric illustration of the instant invention mounted interiorly of an automobile.

With reference now to the drawings, and in particular to FIGS. 1 to 8 thereof, a new and improved visual communication device embodying the principles and concepts of the present invention and generally designated by the reference numeral 10 will be described.

The device includes a control unit 11 mounted overlying or underlying a dash board "D" of a typical automotive vehicle. The control unit 11 is selectively actuatable to energize and effect selective illumination of a display unit 12 that is provided with a display screen is defined by a matrix of light emitting diodes (LED). The display unit 12 is oriented and selectively mounted in a first position onto a rear support shelf "S" of the automobile for viewing of the display screen 13 through the rear window "R" of the vehicle. The display unit 12 further includes a plurality of upwardly extending ears 14 formed with through-extending apertures. The ears 14 each receive an "S" shaped clip 14a directed through the apertures of the ear 14 wherein the "S" shaped clips 14a extend forwardly of the upper surface of the display unit 12 and are provided with terminal ends remote from the ears 14 that extend downwardly for suspending the display unit 12 from a side window "W" of the vehicle, or for suspending the display unit 12 from a number of suction fasteners 14b from a side window "W" or the rear window "R". The rear face 15 of the display unit 12 includes electrical power transmission cord 16 with a mercury switch 17 receiving the power cord 16 from one end of the mercury switch and directing the power cord 16 outwardly into the display unit 12 through the other end. The mercury switch 17 is normally in an on position when vertically oriented, as illustrated in FIG. 3, and as the switch 17 is integrally mounted to the rear face 15 of the display unit 12, horizontal orientation of the display unit 12 will turn the mercury switch 17 to an off position to deactivate the display unit 12. This feature is desirable wherein the display unit in a horizontal orientation will adversely reflect images from the interior surface of the rear window "R" creating a safety hazard to a driver of the vehicle.

Hingedly mounted to the rear face 15 of the display unit adjacent opposite side edges thereof are a first support bracket 18 and a second support bracket 19, each formed with a respective first support flange 18a and second support flange 19a orthogonally oriented to the main body of the support brackets 18 and 19. The first and second support brackets 18 and 19 are of a length to extend beyond the lower edge of the rear face 15 wherein the respective first and second support flanges 18a and 19a are in confronting relationship to one another exteriorly of a bottom surface of the display unit when the first and second brackets 18 and 19 are in a first position orthogonal to the rear face 15 and wherein the first and second flanges 18a and 19a are positioned under the bottom surface of the display unit 12 in a horizontally aligned relationship to one another when the first and second support brackets 18 and 19 are in a second position parallel to the rear face of the display unit 12. Each support flange 18a and 19a includes a hook and loop fastener surface 20 formed on a downwardly extending surface of each support flange to cooperate with an adhesively mounted hook and loop fastener strip 21 securable to the rear support shelf "S". In this manner, the brackets 18 and 19 are fixedly secured in the first position when the hook and loop fastener surfaces 20 are secured to the respective hook and loop fastener strips 21. To fixedly secure the display unit 12 in a second horizontal position when use of the display unit is not desired by an operator of the vehicle, the first and second support brackets 18 and 19 are pivoted to the second position, wherein a respective first bracket fastener strip 22 and a second bracket fastener strip 23 positioned adjacent the elongate hinges of the respective first and second support brackets may thereupon be secured to the hook and loop fastener strips 21. The mercury switch 17, at this juncture, will then deactivate the display unit 12.

Figure 2:
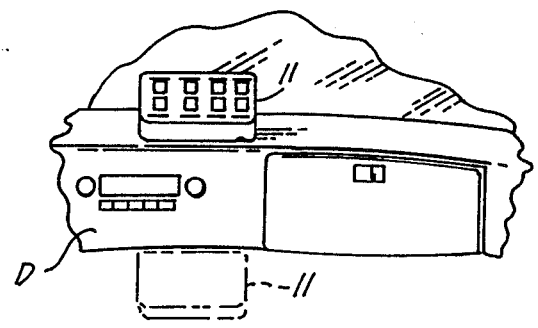
FIG. 2 is an isometric illustration of the control unit mounted to board portion of an automobile.
Figure 5:
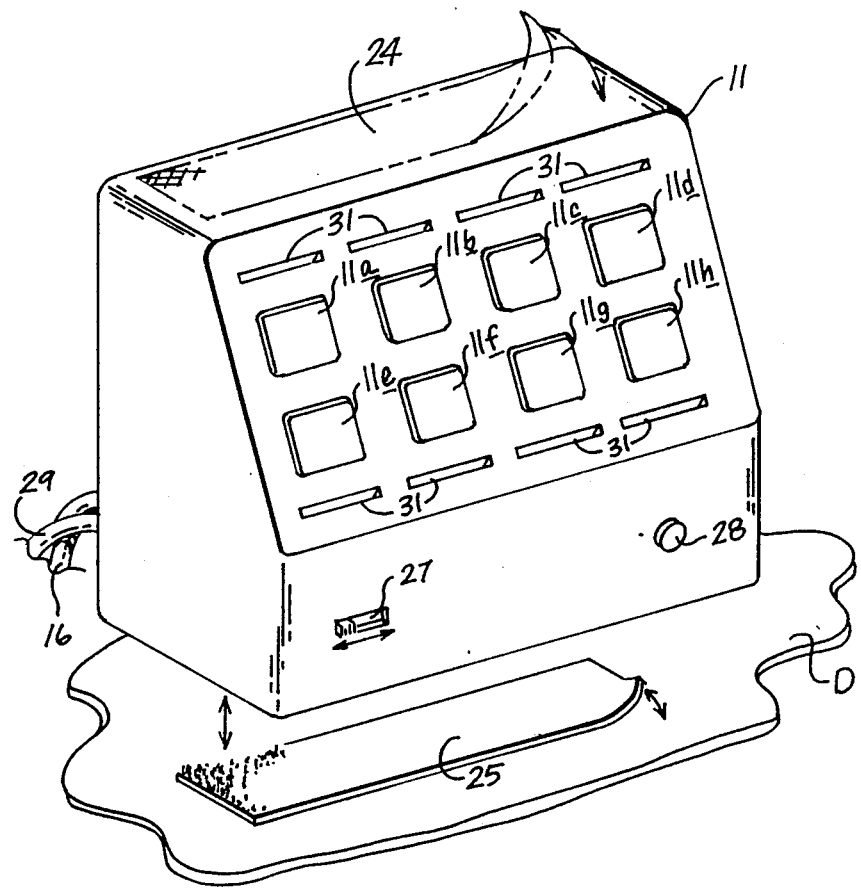
FIG. 5 is an isometric illustration of the control unit and its mounting arrangement.
Figure 6:
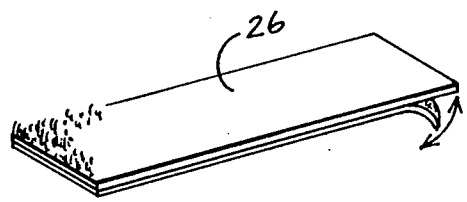
FIG. 6 is an isometric illustration of a typical securement strip utilized by the instant invention.
Figure 7:
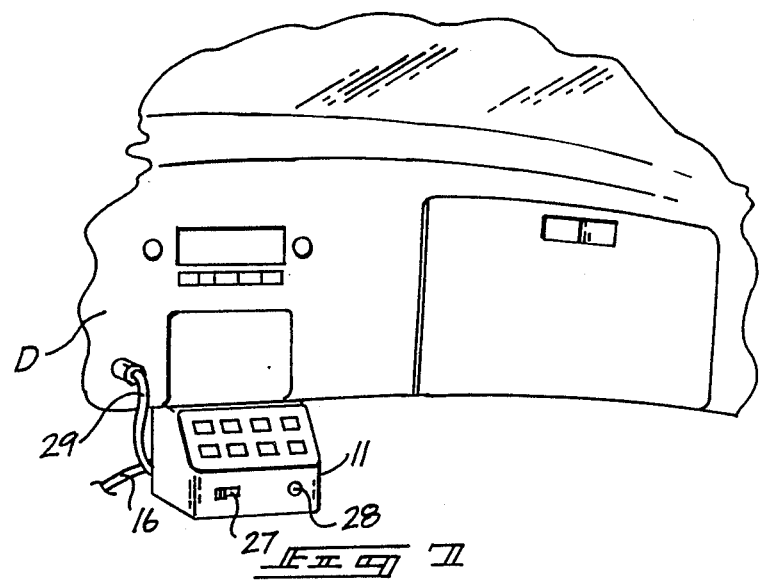
FIG. 7 is an isometric illustration of the control unit mounted to an underlying surface of an associated dash board.

Attention to FIG. 5 illustrates the control unit 11 formed with an adhesive peel-away strip 24 onto an upper surface of the control unit 11 or securement to an underlying surface of the dash board "D" of the vehicle. A first adhesive peel-away hook and loop fastener strip 25 is securable onto an upper surface of the dash board "D" for mounting of the control unit 11 onto a top surface of the dash board. The first hook and loop fastener strip 25 is securable to a second hook and loop fastener strip 26 that is selectively secured to an underlying surface of the control unit 11 to provide for selective securement of the control unit 11 to the dash board "D", as illustrated in FIG. 2 for example.

The control unit 11 includes an on/off switch 27 and an actuator button 28 that is actuated subsequent to the depressing of the individual program actuator buttons 11a, 11b, 11c, 11d, 11e, 11f, 11g, and 11h to actuate individual of the preselected message programs that are inserted within the control unit 11. A cigarette lighter-type adapter and connector 29 is provided to electrically communicate the apparatus with the battery power of the associated automobile.

Figure 8:
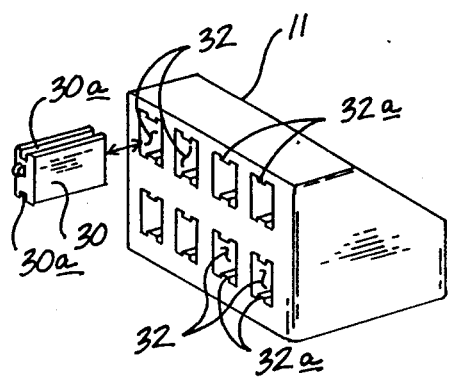
FIG. 8 is an isometric illustration of the signal program cartridges selectively positionable interiorly of the control unit.

FIG. 8 is illustrative of the signal cartridges 30 that are inserted interiorly of the rear face of the control unit 11 wherein each signal cartridge is provided with vertically aligned slots 30a at upper and lower edges of the cartridge for communication and orientation with cartridge receiving ports 32 formed through a rear face of the control unit 11 that are provided with port flanges 32a to cooperate with the slots 30a to appropriately align and receive the cartridges within the ports 32. An indicator light 31 is associated with each of the actuator buttons 11a through 11h to indicate actuation of the actuator buttons. In this manner, various signal cartridges 30 may be directed into the associated ports to selectively vary the signal message to be directed to the LED matrix display of the display unit 12. Conventional circuitry is utilized to communicate the electrical signal from the control unit 11 to the display unit 12 available to one of ordinary skill in the art.

As to the manner of usage and operation of the instant invention, the same should be apparent from the above description and accordingly, no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vehicle communication device for use in combination with a self-propelled vehicle which includes a rear window, side windows, and forwardly oriented dash board within said vehicle, said apparatus comprising, a message display unit defined by a plurality of light emitting diodes arranged in a matrix, said light emitting diodes selectively illuminated to indicate a message, and said display unit including mounting means for selectively mounting said display unit adjacent said rear window, or secured to one of said windows of said vehicle, and a message control unit for selectively energizing said light emitting diodes, said message control unit being operatively interconnected to said light emitting diodes within said display unit and being operative upon actuation of one of a plurality of switches to energize said light emitting diodes in any one of a plurality of preselected patterns, said preselected patterns forming messages for viewing exteriorly of said vehicle, and wherein said display unit is mounted in a first vertical position and operative to receive a signal generated by said control unit, and said display unit when mounted in a second horizontal position being automatically deactivated relative to said control unit, and said display unit including a longitudinally aligned rear face, and a first and second support bracket mounted to the rear face wherein each said first and second support bracket includes respective first and second planar flanges, each said first and second planar flange includes a respective first and second support flange integrally and orthogonally mounted to a lowermost edge of each planar flange, each planar flange including a respective first and second elongate hinge each orthogonally oriented relative to each respective said first and second support flange, and each said first and second elongate hinge mounted to the rear face of the display unit, the first and second elongate hinges arranged parallel to one another, and each said first and second planar flange extends below a lower edge of the rear face and each said first and second support flange includes a respective first and second hook and loop fastener patch mounted to a bottom surface of each said first and second support flange, and further including a hook and loop fastener strip securable to said support shelf and cooperative with the first and second hook and loop fastener patch of each said first and second support flange.

2. A vehicle communication device as set forth in claim 1 further including a power cord for electrically communicating said display unit with said control unit and further including a mercury switch integrally secured to the rear face of a display unit to automatically deactivate the display unit when the display unit is in the second horizontal position.

3. A vehicle communication device as set forth in claim 2 wherein the mounting means of the display unit further includes a plurality of spaced upwardly extending ears integrally formed to an upper surface of the display unit wherein each of the ears includes a through-extending aperture, and further including an "S" shaped clip extending through each aperture for securement of the display unit to a side window.

4. A vehicle communication device as set forth in claim 3 wherein the control unit includes a series of selectively removable signal cartridges, each signal cartridge formed with vertically aligned grooves cooperative with vertically aligned flanges formed within receiving ports of the control unit.

5. A vehicle communication device as set forth in claim 4 wherein the control unit includes a further hook and loop fastener surface formed to a bottom surface of the control unit to secure the control unit to an upper surface of the dash board. and wherein the control unit further includes an adhesive strip formed to an upper surface of the control unit to secure the control unit to a bottom surface of the dash board.

6. A vehicular communication device as set forth in claim 2 wherein the mounting means includes a plurality of spaced upwardly extending ears integrally formed to an upper surface of the display unit wherein each of the ears includes a through-extending aperture, and including a suction fastener selectively securable to each of said ears to enable the display unit to be selectively secured to an interior surface of one of said windows.

* * * * *